(12) United States Patent
Haraoka et al.

(10) Patent No.: US 8,038,170 B2
(45) Date of Patent: Oct. 18, 2011

(54) VEHICLE OCCUPANT RESTRAINT APPARATUS

(75) Inventors: Mutsumu Haraoka, Toyota (JP); Takuya Nezaki, Mizunami (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 218 days.

(21) Appl. No.: 12/351,034

(22) Filed: Jan. 9, 2009

(65) Prior Publication Data
US 2009/0179406 A1   Jul. 16, 2009

(30) Foreign Application Priority Data

Jan. 11, 2008   (JP) .................. 2008-004901

(51) Int. Cl.
*B60R 21/18*   (2006.01)
(52) U.S. Cl. ............. 280/733; 244/122 R; 244/122 AG; 280/729
(58) Field of Classification Search .................. 280/733, 280/729; 244/122 R, 122 B, 122 AG
See application file for complete search history.

(56) References Cited

U.S. PATENT DOCUMENTS

| | | | |
|---|---|---|---|
| 3,865,398 A | | 2/1975 | Woll |
| 3,905,615 A | * | 9/1975 | Schulman .................. 280/730.1 |
| 5,282,648 A | * | 2/1994 | Peterson ...................... 280/733 |
| 6,109,647 A | * | 8/2000 | Akaba et al. .................. 280/733 |
| 6,237,945 B1 | | 5/2001 | Aboud et al. |
| 6,419,267 B1 | * | 7/2002 | Hashimoto et al. ........ 280/743.1 |
| 6,499,763 B1 | | 12/2002 | Mishima et al. |
| 7,600,780 B2 | * | 10/2009 | Tobata et al. ................. 280/733 |
| 2005/0230945 A1 | | 10/2005 | Watanabe |
| 2007/0182136 A1 | | 8/2007 | Nezaki et al. |

FOREIGN PATENT DOCUMENTS

| | | |
|---|---|---|
| GB | 2341358 | 3/2000 |
| JP | 63258239 A | 10/1988 |
| JP | 11342827 | 12/1999 |
| JP | 2002316615 | 10/2002 |
| JP | 2005297917 | 10/2005 |
| JP | 2005343316 | 12/2005 |
| JP | 2006027563 | 2/2006 |
| JP | 2006044614 A | 2/2006 |
| JP | 2007137226 | 6/2007 |
| JP | 2007-210429 A | 8/2007 |
| JP | 2007210428 | 8/2007 |
| JP | 2001106008 | 5/2008 |

OTHER PUBLICATIONS

Office Action issued Nov. 9, 2010 in Japanese Application No. 2008-004901.

* cited by examiner

*Primary Examiner* — Eric Culbreth
(74) *Attorney, Agent, or Firm* — Gifford, Krass, Sprinkle, Anderson & Citkowski, P.C.

(57) ABSTRACT

A vehicle occupant restraint apparatus includes a four-point seat belt that has a pair of right and left shoulder webbings; and air belt portions that are respectively provided for the pair of right and left shoulder webbings. The air belt portions receive gas supplied from an inflator and then deploy so as to restrain a head H of an occupant P from moving forward in the vehicle longitudinal direction.

20 Claims, 9 Drawing Sheets

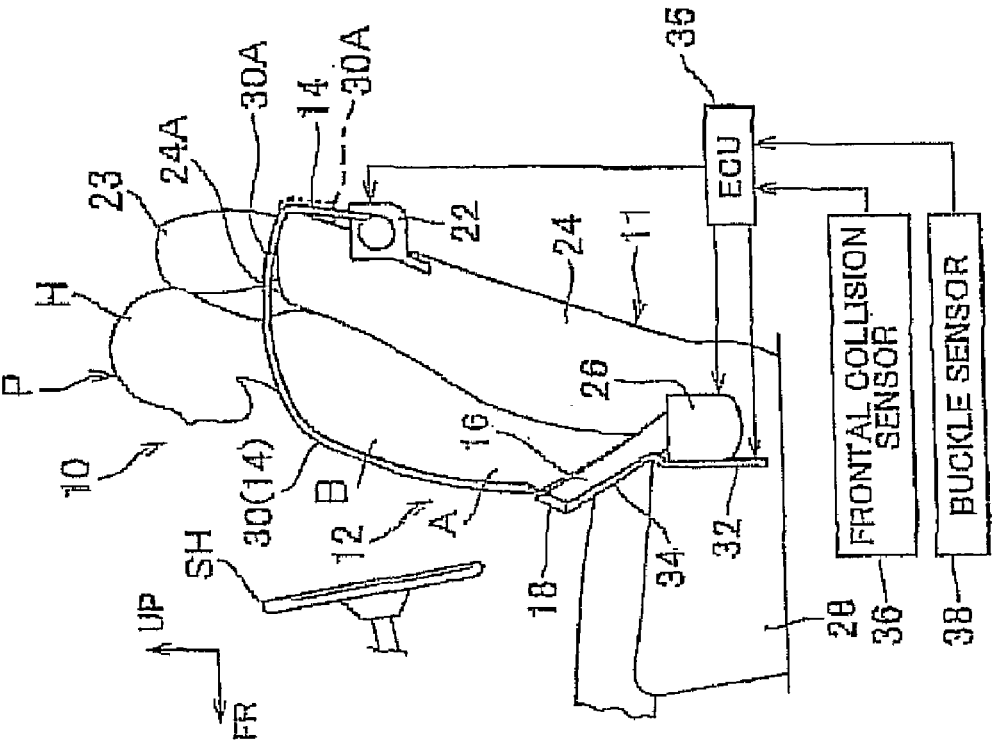
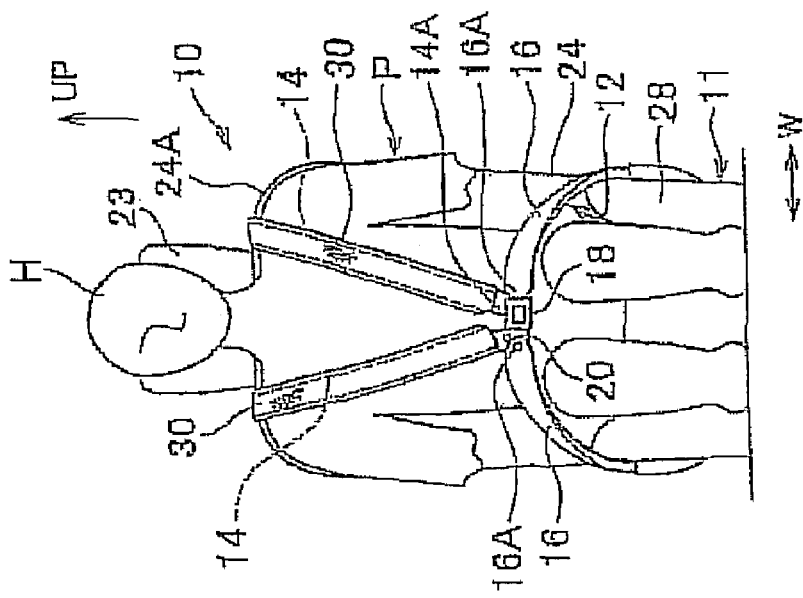

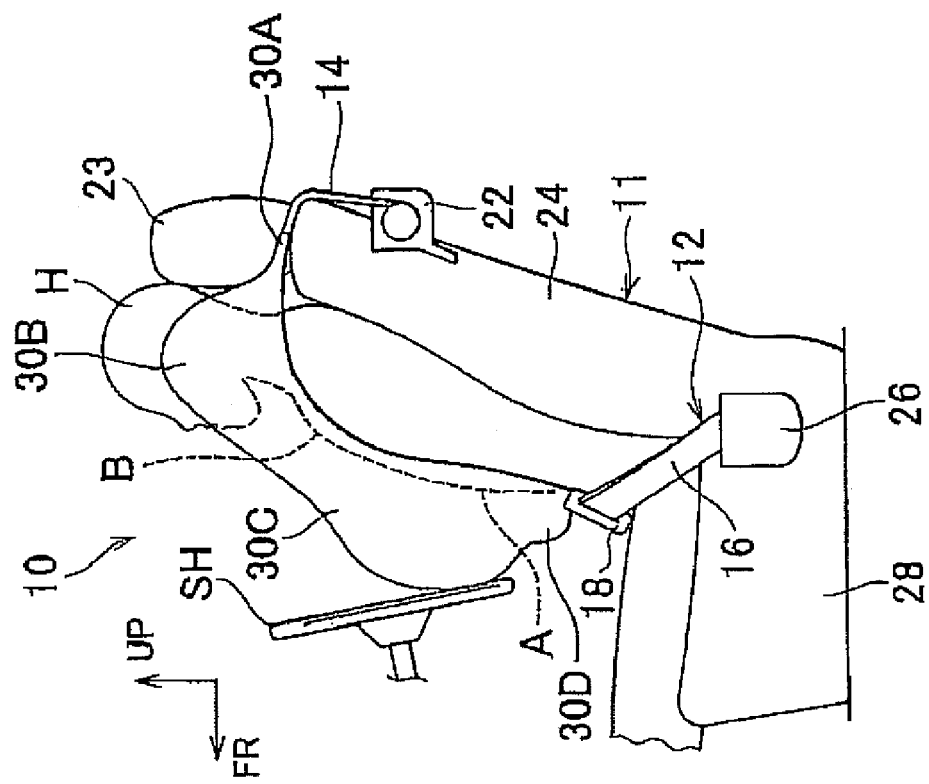
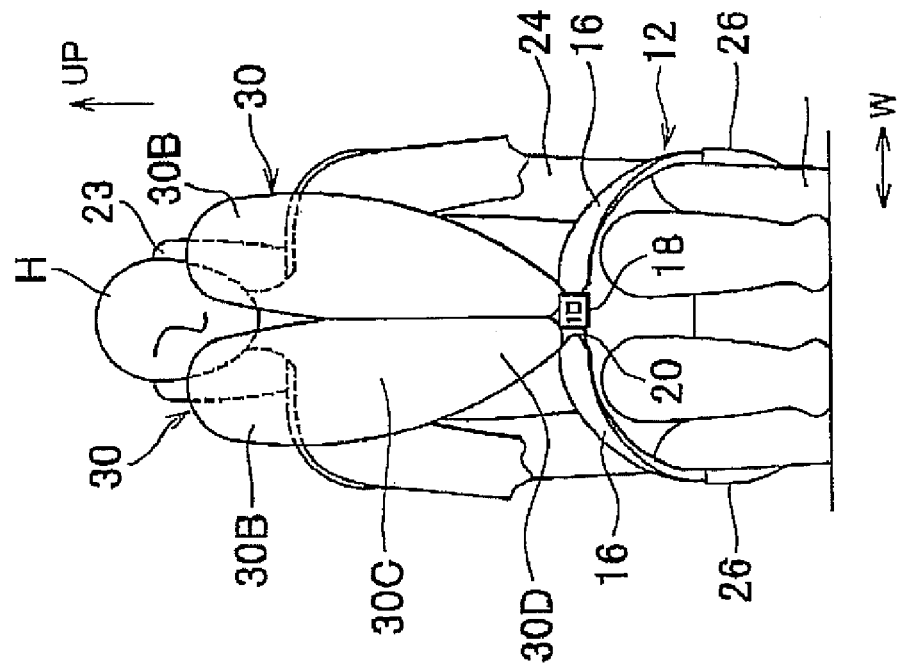

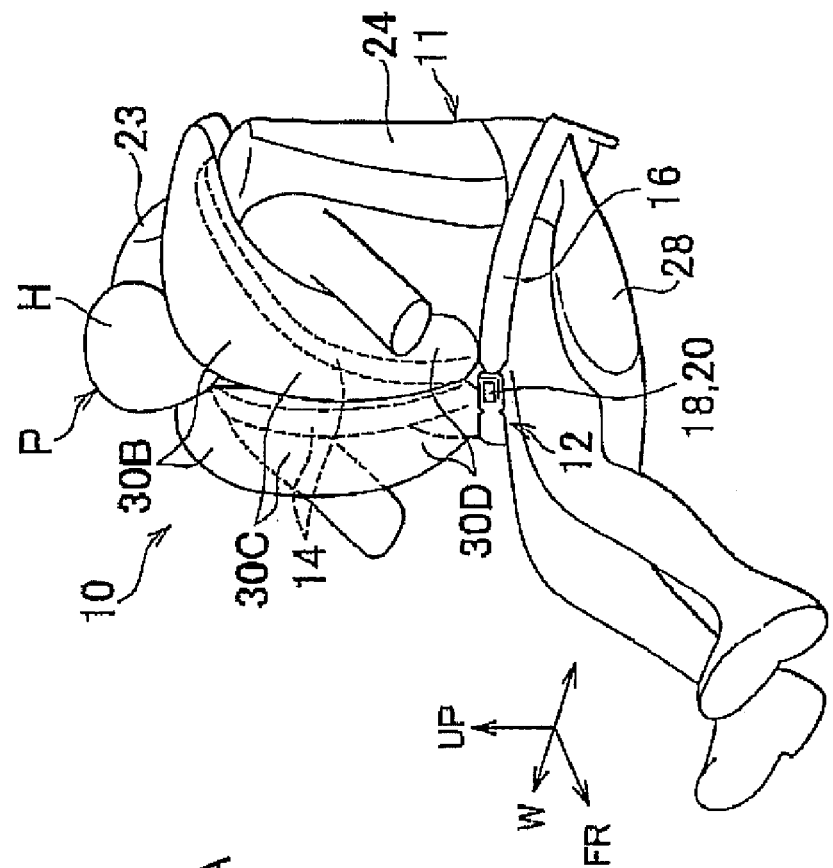
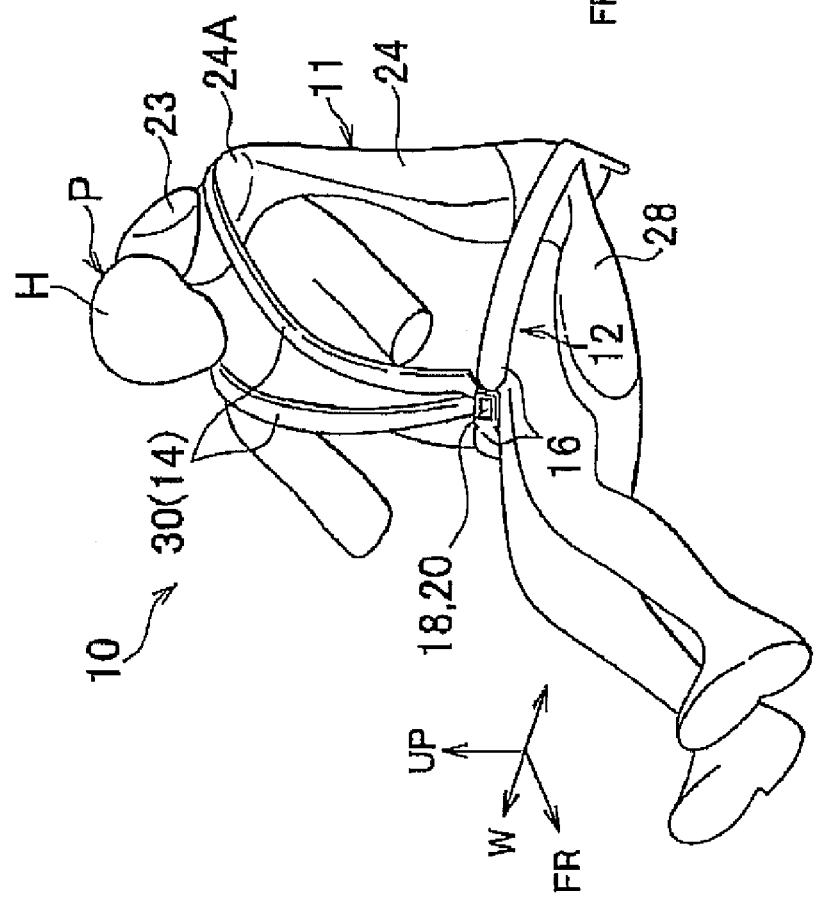
FIG. 3A
FIG. 3B

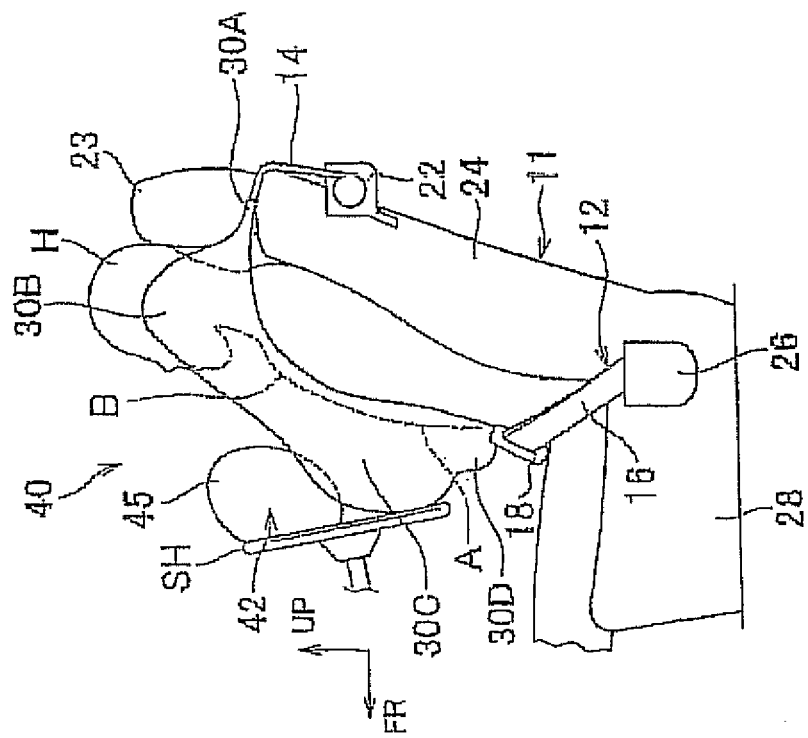
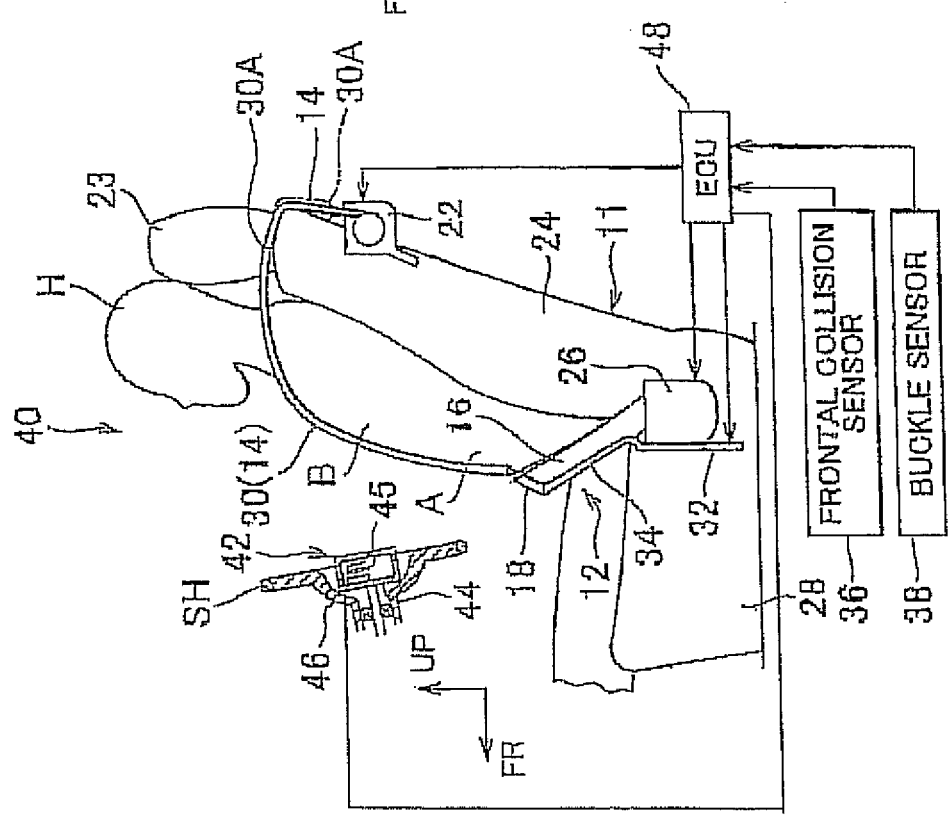

VEHICLE OCCUPANT RESTRAINT APPARATUS

The disclosure of Japanese Patent Application No. 2008-004901 filed on Jan. 11, 2008 including the specification, drawings and abstract is incorporated herein by reference in its entirety.

BACKGROUND OF THE INVENTION

1. Field of the Invention

The invention relates to a vehicle occupant restraint apparatus that restrains an occupant, seated in a seat, to the seat at least in the event of a collision.

2. Description of the Related Art

For example, Japanese Patent Application Publication No. 2005-297917 (JP-A-2005-297917) describes a technique that relates to a vehicle occupant restraint apparatus which includes a shoulder belt that extends obliquely from the shoulder of an occupant on one side toward the hip on the other side and that has an inflatable belt portion. According to JP-A-2005-297917, the vehicle occupant restraint apparatus further includes a head protection airbag that inflates toward the front of a vehicle as the inflatable belt portion inflates, thus receiving an occupant's head. In addition, for example, U.S. Pat. No. 6,237,945, GB Patent Application Publication No. 2341358, Japanese Patent Application Publication No. 2007-210428 (JP-A-2007-210428), Japanese Patent Application Publication No. 2001-106008 (JP-A-2001-106008), and Japanese Patent Application Publication No. 11-342827 (JP-A-11-342827) describe various techniques that an occupant restraint webbing has all inflatable portion.

However, in the technique described in JP-A-2005-297917, the relatively large head protection airbag partially communicates with the inflatable belt portion. Therefore, the deployment behavior of the head protection airbag may be unstable or it may take tirne to complete deployment of the head protection airbag.

SUMMARY OF THE INVENTION

The invention provides a vehicle occupant restraint apparatus that protects the head of an occupant with higher reliability.

An aspect of the invention relates to a vehicle occupant restraint apparatus. The vehicle occupant restraint apparatus includes; a four-point seat belt that has a pair of right and left upper body restraint webbings; and a pair of inflatable portions that are respectively provided for the pair of right and left upper body restraint webbings, wherein the pair of inflatable portions inflate with gas supplied from a gas supply device and then deploy so as to restrain the head of an occupant from moving forward in the vehicle longitudinal direction.

In the above vehicle occupant restraint apparatus, the pair of right and left upper body restraint webbings of the four-point seat belt are worn so as to be able to restrain the upper body of the occupant. For example, as the gas supply device is activated when a vehicle collision (for example, frontal collision) is detected or predicted, the right and left inflatable portions receive gas supplied from the gas supply device and then inflate and deploy into a predetermined shape. Here, in the vehicle occupant restraint apparatus, because the right and left inflatable portions are respectively provided for the upper body restraint webbings, it is possible to restrain the upper body of the occupant from the initial stage of a collision. In addition, in the vehicle occupant restraint apparatus, because the right and left inflatable portions deploy so as to restrain forward movement of the head of the occupant, it is possible to effectively restrain the head of the occupant from moving toward the front of the vehicle (forward tilting of the bead).

Therefore, with the vehicle occupant restraint apparatus described above, it is possible to protect the head of an occupant with higher reliability.

Another aspect of the invention relates to a vehicle occupant restraint apparatus. The vehicle occupant restraint apparatus includes: a four-point seat belt that has a pair of right and left upper body restraint webbings; and a pair of inflatable portions that are respectively provided for the pair of right and left upper body restraint webbings, wherein the pair of inflatable portions inflate with gas supplied from a gas supply device and then deploy so as to contact the head of an occupant from forward in the vehicle longitudinal direction.

In the above vehicle occupant restraint apparatus, the pair of right and left upper body restraint webbings of the four-point seat belt are worn so as to be able to restrain the upper body of the occupant. For example, as the gas supply device is activated when a vehicle collision (for example, frontal collision) is detected or predicted, the right and left inflatable portions receive gas supplied from the gas supply device and then inflate and deploy into a predetermined shape. Here, in the vehicle occupant restraint apparatus, because the right and left inflatable portions are respectively provided for the upper body restraint webbings, it is possible to restrain the upper body of the occupant from the initial stage of a collision. In addition, in the vehicle occupant restraint apparatus, because the right and left inflatable portions deploy so as to contact the head of the occupant from forward, it is possible to effectively restrain the head of the occupant from moving toward the front of the vehicle (forward tilting of the head).

Therefore, with the vehicle occupant restraint apparatus described above, it is possible to protect the head of the occupant with higher reliability.

In the vehicle occupant restraint apparatus according to the aspect of the invention, the pair of inflatable portions may inflate with gas supplied from the gas supply device and may deploy so as to place a face of the occupant in between from both sides.

With the above vehicle occupant restraint apparatus) because the fight and left inflatable portions deploy so as to place the face of the occupant (the lower portion of the head) in between from both sides, it is possible to further effectively restrain the head of the occupant from moving toward the front of the vehicle (forward tilting of the bead). In addition, because the right and left inflatable portions deploy from the upper body restraint webbings, which are located on the front side of the occupant, to place the face of the occupant in between, that is, because the right and left inflatable portions deploy from diagonally forward so as to place the face of the occupant in between, it is possible to effectively restrain forward movement of the head of the occupant irrespective of variation in position of the head due to the body size of the occupant, a seated posture, or the like.

In the vehicle occupant restraint apparatus according to the aspect of the invention, the gas supply device may be arranged below the inflatable portions in the vehicle vertical direction, and may supply gas from lower sides of the inflatable portions in the vehicle vertical direction.

With the above vehicle occupant restraint apparatus, because gas is supplied from the lower sides, that is, from the waist side of the occupant, to the inflatable portions provided for the upper body restraint webbings, the inflatable portions at the waist side inflate and deploy in a short time. Thus, for example, it is possible to prevent a contact of the abdomen, which is located closer to a vehicle body (steering wheel, instrument panel, or the like) than the other portions in the upper body of the occupant, with the vehicle body.

In the vehicle occupant restraint apparatus according to the aspect of the invention, portions corresponding to a chest of the occupant in the pair of inflatable portions when deployed may be thicker in the vehicle longitudinal direction than the other portions of the pair of inflatable portions.

With the above vehicle occupant restraint apparatus, portions that correspond to the chest of the occupant in the inflatable portions and that are located below the portions which correspond to the head of the occupant in the inflatable portions inflate and deploy in a short time with gas supplied from the lower sides. Therefore, the chest, which has relatively large mass (inertia) in the upper body, is quickly restrained. In addition, because portions corresponding to the chest in the inflatable portions deploy largely in the vehicle longitudinal direction as compared with the other portions of the inflatable portions which correspond to the other portions of the occupant, it is possible to prevent a contact of the chest of the occupant with the vehicle body (steering wheel, instrument panel, or the like).

The vehicle occupant restraint apparatus according to the aspect of the invention may further include an airbag that is applied to a driver's seat and that is provided inside a steering wheel so as not to follow rotation of the steering wheel. The airbag may inflate with gas supplied from the gas supply device and then deploy so as to cover only an upper portion of the steering wheel in the vehicle vertical direction or deploy so that a portion of the airbag that covers a lower portion of the steering wheel in the vehicle vertical direction is thinner than a portion of the airbag that covers the upper portion of the steering wheel in the vehicle vertical direction.

With the above vehicle occupant restraint apparatus, it is possible to deploy and place the lower portions of the inflatable portions, which are supplied with gas from the lower sides, between the steering wheel and the abdomen of the occupant in a short time. In addition, it is possible to deploy and place the portions corresponding to the chest in the inflatable portions between the steering wheel and the chest of the occupant so as to be thicker than the other portions of the inflatable portions. Thus, the airbag provided for the steering wheel just needs to mainly cover the upper portion of the steering wheel. That is, the airbag provided for the steering wheel just needs to cover only the upper portion of the steering wheel or to deploy a portion of the airbag that covers the lower portion of the steering wheel so as to be narrower than a portion of the airbag that covers the upper portion of the steering wheel. In this way, the airbag may be reduced in size and simplified.

In the vehicle occupant restraint apparatus according to the aspect of the invention, portions of bag elements that inflate with gas supplied from the gas supply device may be folded inward along longitudinal directions of the respective webbings so as to deploy to face the head of the occupant, and the folded portions may be sewed with tear seams that break at an internal pressure in the bag elements, which is higher than or equal to a predetermined value, to form the pair of inflatable portions.

With the above configuration, when the gas supply device is activated and then the inflatable portions inflate, portions that at least partially include the folded portions of the bag elements contact the head (face) of the occupant. Tear seams break at the internal pressure in the bag elements at portions of the folded portions that are not in contact with the head of the occupant, while tear seams do not break due to reactive force from the head at portions of the folded portions that are in contact with the head of the occupant. Thus, for example, when a gap is present below the head of the occupant, the gap is occupied by portions of the bag elements (inflatable portions), which deploy as the folded portions of the bag elements are eliminated in accordance with breakage of the tear seams. Thus, in the vehicle occupant restraint apparatus, a pressure to the head of the occupant is reduced, while the inflatable portions deploy to under the chin, or the like, of the occupant. Thus, it is possible to further effectively restrain forward movement of the head of the occupant.

In the vehicle occupant restraint apparatus according to the aspect of the invention, the pair of inflatable portions each may include a partition member inside a bag element that inflates with gas supplied from the gas supply device, the partition member may partition an inside of the bag element into an occupant-side chamber that deploys in such a manner that an inner portion of the bag element faces toward the head of the occupant and an anti-occupant-side chamber that deploys so as to face a side opposite to the head of the occupant, the gas supply device may supply gas to the anti-occupant-side chamber in each bag element, and each partition member may have a plurality of communication holes that are spaced apart from one another and arranged in the vehicle vertical direction when the bag element is deployed.

With the above vehicle occupant restraint apparatus, because gas is supplied from the anti-occupant-side chambers located on the far side from the occupant in the inflatable portions, the internal pressures in the occupant-side chambers become relatively low in the process of deployment. Thus, in the vehicle occupant restraint apparatus, it is possible to reduce a pressure to the head of the occupant in process of deployment of the inflatable portions.

In the vehicle occupant restraint apparatus according to the aspect of the invention, the plurality of communication holes may be formed in such a manner that the communication holes located at a lower side in the vehicle vertical direction are larger than the communication holes located at an upper side in the vehicle vertical direction.

With the above vehicle occupant restraint apparatus, because the communication holes of each partition cloth are formed in such a manner that the communication holes located at the lower side are larger than the communication holes located at the upper side, the occupant-side chambers gradually deploy from the lower sides in process of deployment. Thus, in the vehicle occupant restraint apparatus, it is possible to further reduce a pressure to the head of the occupant in process of deployment of the inflatable portions. In addition, it is possible to reduce the upthrust of the inflatable portions from the lower side to the head (face) of the occupant.

The vehicle occupant restraint apparatus according to the aspect of the invention may further include guide portions that are provided on an upper portion of a seat back and that restrict movement of the inflatable portions in a seat width direction. The guide portions each may have a support portion that supports a corresponding one of the inflatable portions from a side opposite to the occupant side in a state where the guide portion is deployed as the inflatable portion inflates.

With the above vehicle occupant restraint apparatus, when the gas supply device is activated and then the inflatable portions inflate, the guide portions are deployed to support the inflatable portions. In this deployed position, portions of or entire guide portions serve as support portions to support the inflatable portions respectively from sides opposite to the occupant's head (the other inflatable portion) side. Thus, the pair of inflatable portions restrained from moving in the vehicle width direction away from each other and, therefore, it is possible to further effectively restrain forward movement of the head of the occupant.

In the vehicle occupant restraint apparatus according to the aspect of the invention, the guide portions may be deployed as the inflatable portions inflate and may restrict deployment of the inflatable portions in such a manner that a cross-sectional shape of each inflatable portion when deployed is oblong in the vehicle vertical direction.

With the above vehicle occupant restraint apparatus, the guide portions are deployed on the seat back as the inflatable portions inflate and support the inflatable portions with the support portions respectively from sides opposite to the occupant sides, while restricting deployment of the inflatable portions in such a manner that the inflatable portions each form an oblong cross-sectional shape. Thus, the inflatable portions also maintain the oblong cross sections on both sides of the head of the occupant, and cover a wide range in the vertical direction of the head of the occupant from both sides. Thus, in the vehicle occupant restraint apparatus, for example, it is possible to deploy the inflatable portions in the event of a side collision to thereby protect the head of the occupant.

With the vehicle occupant restraint apparatus described above, it is possible to protect the bead of the occupant with higher reliability.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1A is a front view of a vehicle occupant restraint apparatus according to a first embodiment of the invention, and FIG. 1B is a side view of the vehicle occupant restraint apparatus;

FIG. 2A is a front view of deployed air belt portions in the vehicle occupant restraint apparatus according to the first embodiment of the invention, and FIG. 2B is a side view of the deployed air belt portions;

FIG. 3A is a perspective view of the vehicle occupant restraint apparatus that is worn by an occupant and that is in a normal state according to the first embodiment of the invention, and FIG. 3B is a perspective view of the vehicle occupant restraint apparatus when the air belt portions are deployed;

FIG. 4A is a side view of a vehicle occupant restraint apparatus that is worn by an occupant and that is in a normal state according to a second embodiment of the invention, and FIG. 4B is a side view of the vehicle occupant restraint apparatus when the air belt portions are deployed;

DETAILED DESCRIPTION OF EMBODIMENTS

Figure 5:
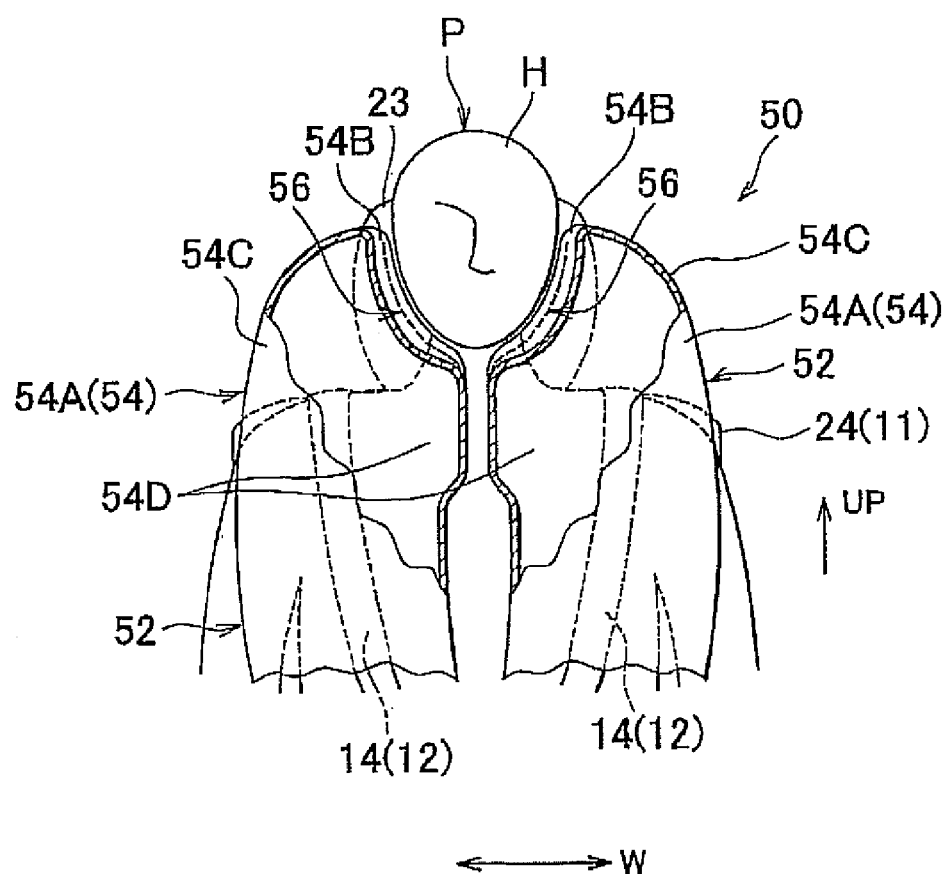
FIG. 5 is a front view of a main portion of a vehicle occupant restraint apparatus according to a third embodiment of the invention.

A vehicle occupant restraint apparatus 10 according to a first embodiment of the invention will be described with reference to FIG. 1A to FIG. 3B. Note that the arrow FR, the arrow UP and the arrow W shown in the drawings respectively indicate the forward direction (traveling direction), upward direction and vehicle width direction of a vehicle equipped with the vehicle occupant restraint apparatus 10. These substantially correspond to the forward direction, upward direction and vehicle width direction of a vehicle seat 11 to which the vehicle occupant restraint apparatus 10 is applied.

FIG. 1A schematically shows a front view of the overall configuration of the vehicle occupant restraint apparatus 10. FIG. 1B schematically shows a side view of the overall configuration of the vehicle occupant restraint apparatus 10. As shown in these drawings, the vehicle occupant restraint apparatus 10 includes a four-point seat belt 12. The four-point seat belt 12 includes a pair of right and left shoulder webbings 14 and a pair of right and left lap webbings 16. The shoulder webbings 14 serve as upper body restraint webbings. The lap webbings 16 serve as hip restraint webbings.

The lower end 14A of the shoulder webbing 14 in the vehicle vertical direction on one side is coupled to the inner end 16A of the lap webbing 16 in the seat width direction on the same side through a buckle 18. The lower end 14A of the shoulder webbing 14 on the other side is coupled to the inner end 16A of the lap webbing in the seat width direction through a tongue plate 20 that can be engaged with or disengaged from the buckle 18.

In addition, as shown in FIG. 1B, the upper ends of the shoulder webbings 14 in the vehicle vertical direction are retracted into separate upper retractors 22 or a common upper retractor 22 so that the shoulder webbings 14 can be retracted or withdrawn. In the present embodiment, the upper retractor(s) 22 is/are provided on the back surface of a seat back 24 that constitutes the vehicle seat 11, the shoulder webbings 14 are slidably looped over an upper end surface (shoulder portion) 24A of the seat back 24 respectively on both sides of a head rest 23 in the seat width direction. The outer end of each lap webbing 16 in the seat width direction is retracted into a lower retractor 26 so that the lap webbing 16 can be retracted or withdrawn. Each lower retractor 26 is arranged on a side of the lower end of the seat back 24 or on a side of the rear end of a seat cushion 28.

In the four-point seat belt 12, as shown in FIG. 1A, FIG. 1B and FIG. 3A, when the tongue plate 20 is fastened to the buckle 18, the right and left shoulder webbings 14 are worn so as to be able to restrain the upper body of an occupant P respectively from the shoulders to the waist (abdomen), and the right and left lap webbings 16 are integrally worn so as to be able to restrain the hip of the occupant.

The vehicle occupant restraint apparatus 10 includes air belt portions 30 provided respectively for the shoulder webbings 14. The air belt portions 30 serve as inflatable portions. As shown in FIG. 1B, when the shoulder webbings 14 are worn by the occupant P, the air belt portions 30 each extend over the range from the lower end 14A of the shoulder webbing 14 to the upper end surface 24A of the seat back 24. When the shoulder webbings 14 are released from the occupant P, the upper retractor 22—side end 30A of each air belt portion 30 is located immediately above the upper retractor 22 (see the imaginary line in FIG. 1B).

Each air belt portion 30 is formed in such a manner that a folded bag element, which inflates with gas supplied from an inflator 32, is covered with a cover having seam portions. The seam portions break as the bag element inflates. The following description will be mainly based on the deployed air belt portions 30, so each air belt portion 30 is synonymous with the above bag element (which is hidden when not activated).

The inflator 32 is, for example, fixed to the seat cushion (frame) as shown in FIG. 1B, and communicates with the lower portion of each air belt portion 30 in the vehicle vertical direction through a flexible tube 34 and the buckle 18 or tongue plate 20. Thus, in the vehicle occupant restraint apparatus 10, as the inflator 32 is activated, gas is supplied from the lower sides of the air belt portions 30 into the air belt portions 30. Hence, in the present embodiment, the inflator 32, the flexible tube 34, the buckle 18 or tongue plate 20, and the like, may be regarded as a gas supply device according to the aspects of the invention. However, the gas supply device (arrangement of the inflator 32 and/or a gas supply passage to the air belt portions 30) is not limited to the above example.

Activation of the inflator 32 is controlled by an ECU 35, which serves as a control unit. The ECU 35 is electrically connected to a frontal collision sensor 36 and a buckle sensor 38. The frontal collision sensor 36 detects or predicts a frontal collision to the vehicle equipped with the vehicle occupant restraint apparatus 10. The buckle sensor 38 outputs a signal that indicates that the buckle 18 is fastened to the tongue plate 20. The ECU 35 activates the inflator 32 when the ECU 35 determines that the buckle 18 is fastened to the tongue plate 20 on the basis of the signal from the buckle sensor 38 and a frontal collision occurs or is unavoidable on the basis of the signal from the frontal collision sensor 36.

In addition, in the present embodiment, the ECU 35 is also electrically connected to the upper retractor(s) 22 and the lower retractors 26. Then, the ECU 35 activates pretensioners provided for the upper retractor(s) 22 and the lower retractors 26 when the ECU 35 determines that the buckle 18 is fastened to the tongue plate 20 on the basis of the signal (buckle ON signal) from the buckle sensor 38 and a frontal collision occurs or is unavoidable on the basis of the signal from the frontal collision sensor 36 (when the ECU 35 receives a frontal collision signal). Note that the vehicle occupant restraint apparatus 10 may, for example, include the upper retractor(s) 22 having no pretensioner.

Then, as shown in FIG. 2A, FIG. 2B and FIG. 3B, when the air belt portions 30 of the vehicle occupant restraint apparatus 10 inflate with gas supplied from the inflator 32 and then deploy, the upper portions 30B are located immediately in front of the head H of the occupant P or contact the head H from forward. That is, the deployed pair of right and left air belt portions 30 restrain (restrict) forward movement of the head H in the vehicle longitudinal direction. In the present embodiment, as shown in FIG. 2A and FIG. 3B, the air belt portions 30 provided for the right and left shoulder webbings 14 deploy so as to place the lower portion (face) of the head H in between from the right and left sides in pairs (contact from diagonally forward).

In addition, the middle portions 30C of the deployed air belt portions 30 in the vehicle vertical direction are located in front of the chest B of the occupant P, and the lower portions 30D of the deployed air belt portions 30 in the vehicle vertical direction are located in front of the abdomen A of the occupant P. Then, as shown in FIG. 2B, the middle portions 30C (and part of the lower portions 30D) of the air belt portions 30 in the vehicle vertical direction deploy (inflate) largely in the vehicle longitudinal direction as compared with the other portions of the air belt portions 30. That is, the middle portions 30C of the deployed air belt portions 30 are thicker in the longitudinal direction (larger in inflated diameter in the longitudinal direction) than the other portions of the deployed air belt portions 30.

Next, the effects of the first embodiment of the invention will be described.

In the vehicle occupant restraint apparatus 10 having the above-described configuration, when the occupant P seated in the vehicle seat 11 fastens the tongue plate 20 to the buckle 18, as shown in FIG. 1A, FIG. 1B and FIG. 3A, the pair of right and left shoulder webbings 14 are respectively worn on the upper body of the occupant P, and the right and left lap webbings 16 are worn around the hip of the occupant P.

When the ECU 35 receives the buckle ON signal from the buckle sensor 38 and also receives the frontal collision signal from the frontal collision sensor 36, the ECU 35 activates the inflator 32 and the pretensioners of the upper retractor(s) 22 and lower retractors 26. Then, the shoulder webbings 14 and the lap webbings 16 are forcibly retracted by the upper refractors 22 and the lower retractors 26 and, therefore, the shoulder webbings 14 and the lap webbings 16 closely contact the occupant P. In addition, as shown in FIG. 2A, FIG. 2B, and FIG. 3B, gas generated by the inflator 32 is supplied through the flexible tube 34, and the like, to the air belt portions 30, and then the right and left air belt portions 30 both inflate and deploy. Thus, in the vehicle occupant restraint apparatus 10, restraint force from the air belt portions 30 is applied to the occupant P to restrain forward movement of the occupant P due to inertia.

Here, in the vehicle occupant restraint apparatus 10, because the air belt portions 30 are respectively provided for the shoulder webbings 14 of the four-point seat belt 12, it is possible to improve restraint force (tension) of the shoulder webbings 14 at an initial stage of a frontal collision to thereby effectively restrain forward movement of the upper body of the occupant P from the initial stage of the frontal collision.

Then, in the vehicle occupant restraint apparatus 10, because the air belt portions 30 deploy immediately in front of the head H of the occupant P or so as to contact the head H from forward, forward movement (forward tilting) of the head H is effectively restrained. In addition, in the vehicle occupant restraint apparatus 10, because the right and left air belt portions 30 inflate and deploy so as to place the lower portion (face) of the head H in between, it is possible to block the path of the forward movement of the head H to thereby further effectively restrain movement of the head H toward the front of the vehicle. Particularly, because the right and left air belt portions 30, which are located below the head H when not deployed, inflate and deploy to place the lower portion of the head H in between, the path of downward movement of the head H is also blocked and, therefore, it is further effectively restrain forward tilting of the head H.

In addition, in the vehicle occupant restraint apparatus 10, the right and left air belt portions 30 deploy from the shoulder webbings 14 located on the front side of the occupant P and place the lower portion (face) of the head H of the occupant P in between, that is, the right and left air belt portions 30 deploy from diagonally forward so as to place the face of the occupant in between. Thus, it is possible to effectively restrain forward movement of the head H of the occupant P irrespective of variation in position of the head H due to the body size of the occupant P, a seated posture, or the like.

Furthermore, in the vehicle occupant restraint apparatus 10, because gas from the inflator 32 is supplied from the lower sides of the air belt portions 30 in the vehicle vertical direction, the lower portions 30D of the air belt portions 30 deploy in a short time (quickly). This prevents a contact of the abdomen A of the occupant P with a steering wheel SH (in the case of a diver's seat), or the like. As shown in FIG. 1B, the abdomen A of the occupant P is located closer to the steering wheel SH than the other portions, the abdomen A generally tends to contact the steering wheel SH in the event of a frontal collision. As a measure for this, in the vehicle occupant restraint apparatus 10, the lower portions 30D of the air belt portions 30 deploy in a short time. This prevents a contact of the abdomen A of the occupant P with the steering wheel SH, or the like, as described above.

Furthermore, in the vehicle occupant restraint apparatus 10, the middle portions 30C of the air belt portions 30 are large in size in the vehicle longitudinal direction as compared with the other portions of the air belt portions 30, that is, the middle portions 30C of the air belt portions 30 project forward largely in a short time. Thus, it is possible to quickly restrain the chest, which has large mass (inertia) in the upper body of the occupant P. That is, it is possible to suppress the amount of forward movement of the occupant P at the initial stage of a frontal collision to a lesser degree. In addition, in the vehicle occupant restraint apparatus 10, the middle portions 30C of the air belt portions 30 deploy largely in the vehicle longitudinal direction. Thus, portions in the range from the middle portions 30C to the lower portions 30D of the air belt portions 30 quickly contact the steering wheel SH. This effectively prevents a contact of the chest B of the occupant P with the steering wheel SH, or the like.

In addition, in the vehicle occupant restraint apparatus 10, the right and left air belt portions 30 deploy on both right and left sides of the head H of the occupant P. This restrains movement of the head H of the occupant P in the vehicle width direction (transverse direction). Thus, for example, even when a frontal collision occurs when the head H of the occupant P is deviated laterally with respect to the widthwise middle of the vehicle seat 11 or even when an offset frontal collision occurs, it is possible to effectively restrain forward and lateral movement of the head H of the occupant P. That is, it is possible to hold the head H of the occupant P at an appropriate position.

Note that in the above description, the effects are described on the basis of an example in which the aspects of the invention are applied to the driver's seat. Instead, for example, when the vehicle occupant restraint apparatus 10 is applied to a passenger seat, the above configured air belt portions 30 are able to prevent a contact of the abdomen of the passenger seat occupant P with an instrument panel, or the like. In addition, when the vehicle occupant restraint apparatus 10 is applied to a back seat as well, it is possible to prevent a contact of the occupant P with a front obstacle.

Next, other embodiments of the invention will be described. Like reference numerals to those of the first embodiment or the above described configuration denote like components to those of the first embodiment or the above described configuration, and the description and illustration thereof may be omitted where appropriate.

FIG. 4A shows a side view, which corresponds to FIG. 1B, of a vehicle occupant restraint apparatus 40 according to a second embodiment of the invention. As shown in the drawing, the vehicle occupant restraint apparatus 40 differs from the vehicle occupant restraint apparatus 10 according to the first embodiment in that the vehicle occupant restraint apparatus 40 includes an airbag device 42 provided for the steering wheel SH. The airbag device 42 is provided at the center of the steering wheel SH, and does not follow steering (rotation) of the steering wheel SH. The steering wheel SH is rotatably supported with respect to the above airbag device 42 by means of a known technique, and the description thereof is omitted.

The airbag device 42 includes a case 44, an airbag 45 which is a bag element, and an inflator 46 as major components. The airbag 45 and the inflator 46 are provided inside the case 44. When the airbag 45 inflates with gas supplied from the inflator 46, as shown in FIG. 4B, the airbag 45 deploys to cover only the upper half of the steering wheel SH.

The inflator 46 of the airbag device 42 is controlled for activation (timing) by an ECU 48, which serves as a control unit. The ECU 48 activates the inflators 32 and 46 and the pretensioners of the upper retractor(s) 22 and lower retractors 26 when the ECU 48 determines that the buckle 18 is fastened to the tongue plate 20 on the basis of the signal from the buckle sensor 38 and a frontal collision occurs or is unavoidable on the basis of the signal from the frontal collision sensor 36. The other configuration of the vehicle occupant restraint apparatus 40 is similar to the corresponding configuration of the vehicle occupant restraint apparatus 10.

Thus, with the vehicle occupant restraint apparatus 40 according to the second embodiment as well, it is possible to obtain similar advantageous effects through the basically similar operation to that of the vehicle occupant restraint apparatus 10 according to the first embodiment.

In addition, because the vehicle occupant restraint apparatus 40 includes the airbag device 42, it is possible to further improve the occupant protection performance against a frontal collision. Here, in the vehicle occupant restraint apparatus 40, the lower portions 30D and middle portions 30C of the air belt portions 30 quickly deploy to contact the steering wheel SH as described above to thereby effectively protect the abdomen A and chest B of the occupant P. Therefore, when the airbag device 42 covers the upper half of the steering wheel SH with the airbag 45, it is possible to obtain favorable occupant protection performance.

Thus, for example, in comparison with an airbag device that is combined with a typical three-point seat belt, the airbag device 42 has the airbag 45 and inflator 46 that are reduced in volume and, in addition, the structure of the airbag device 42 may be simplified. That is, in the vehicle occupant restraint apparatus 40, for example, in comparison with the vehicle occupant restraint apparatus 10, it is possible to obtain the occupant protection performance equivalent to the vehicle occupant restraint apparatus 10 with smaller air belt portions 30. Note that the airbag 45 is not limited to the configuration that the airbag 45 covers only the upper half of the steering wheel SH; instead, for example, the airbag 45 may vertically deploy in an asynchronous manner such that a portion of the airbag 45 that covers (at least portion of) the lower portion of the steering wheel SH is thinner than a portion of the airbag 45 that covers the upper portion of the steering wheel SH. With this configuration as well, the volumes of the airbag 45 and inflator 46 may be reduced, and the structure of the airbag device 42 may be simplified.

FIG. 5 shows a front view of a main portion of a vehicle occupant restraint apparatus 50, with part cut away, according to a third embodiment of the invention. As shown in the drawing, the vehicle occupant restraint apparatus 50 differs from the vehicle occupant restraint apparatus 10 according to the first embodiment in that air belt portions 52 are provided for the shoulder webbings 14 in place of the air belt portions 30. The air belt portions 52 deploy also to under the chin of the occupant P, that is, the lower side of the head H.

Figure 6A:
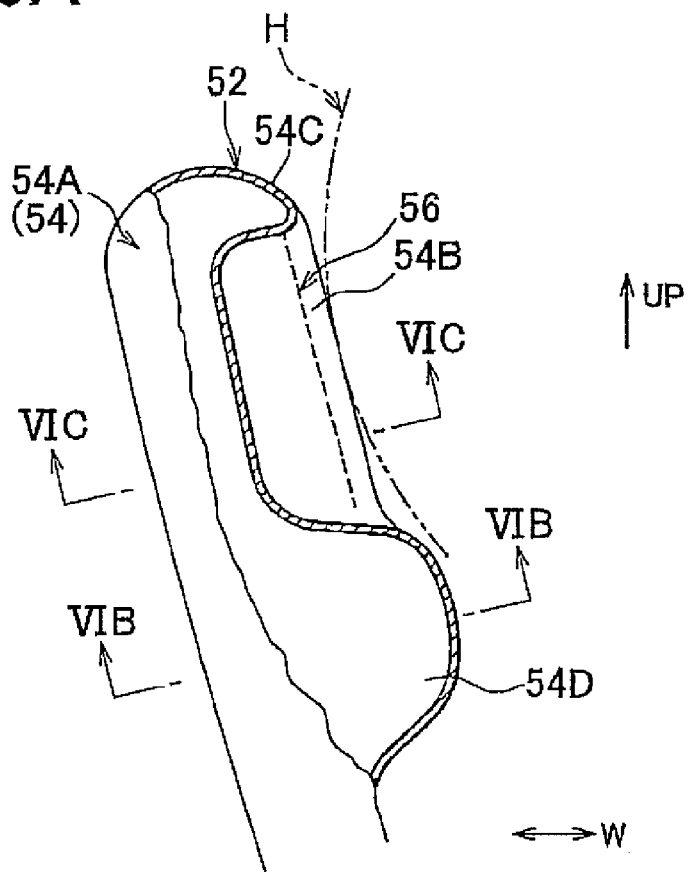
FIG. 6A is a front view of deployed air belt portion that constitutes the vehicle occupant restraint apparatus, with part cut away, according to the third embodiment of the invention.

Specifically, as shown in FIG. 6A, a folded portion 54B, which is formed by folding a bag element 54 of each air belt portion 52 inward, is present at a portion that faces the head H when an upper portion 54A of each bag element 54 that constitutes the air belt portion 52 deploys. A portion of the bag element 54 adjacent to a boundary between the folded portion 54B and an ordinary portion 54C other than the folded portion 54B (opening of the folded portion 54B) is sewed with tear seams (tether) 56 so that each folded portion 54B is maintained in a folded state (see also FIG. 6C). The tear seams 56 are provided in the longitudinal direction of each shoulder webbing 14.

Figure 6B:
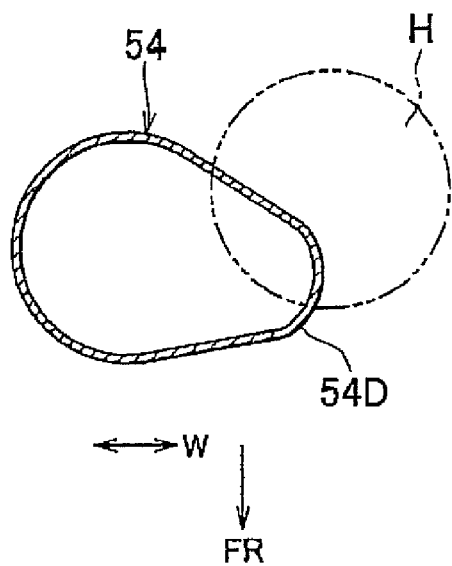
FIG. 6B is a cross-sectional view that is taken along the line VIB-VIB in FIG. 6A.
Figure 6C:
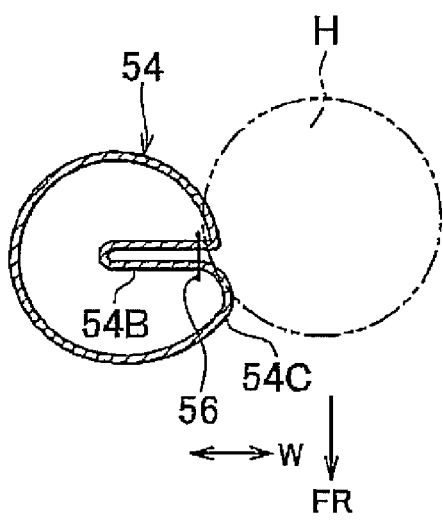
FIG. 6C is a cross-sectional view that is taken along the line VIC-VIC in FIG. 6A.

These tear seams 56 break when the internal pressure in the bag element 54 is larger than or equal to a predetermined value. Thus, each air belt portion 52 is configured so that when the tear seams 56 break, the folded portion 54B is eliminated by the internal pressure in the bag element 54 and then a projected portion 54D is formed as shown in FIG. 6A and FIG. 6B. The other configuration of the vehicle occupant restraint apparatus 50 is similar to the corresponding configuration of the vehicle occupant restraint apparatus 10.

Thus, with the vehicle occupant restraint apparatus 50 according to the third embodiment as well, it is possible to obtain similar advantageous effects through the basically similar operation to that of the vehicle occupant restraint apparatus 10 according to the first embodiment.

In addition, in the vehicle occupant restraint apparatus 50, the folded portion 54B sewed with the tear seams 56 is formed in the bag element 54 of each air belt portion 52. Thus, as shown in FIG. 6A and FIG. 6B, when the internal pressure in each bag element 54 reaches a predetermined value or above as the bag element 54 inflates and deploys, the tear seams 56 break and the projected portion 54D deploys to under the chin of the occupant P as shown in FIG. 5. On the other hand, the tear seams 56 do not break at portions that contact the head H (face) in the folded portions 54B due to reactive force from the head H. Thus, the vehicle occupant restraint apparatus 50 is able to prevent a pressure from being applied to the head of the occupant P while deploying the bag elements 54 (projected portions 54D) of the air belt portions 52 to under the chin of the occupant P. Deployment of the bag elements 54 to under the chin can further effectively restrain forward movement of the occupant P and forward tilting of the head H.

Figure 7:
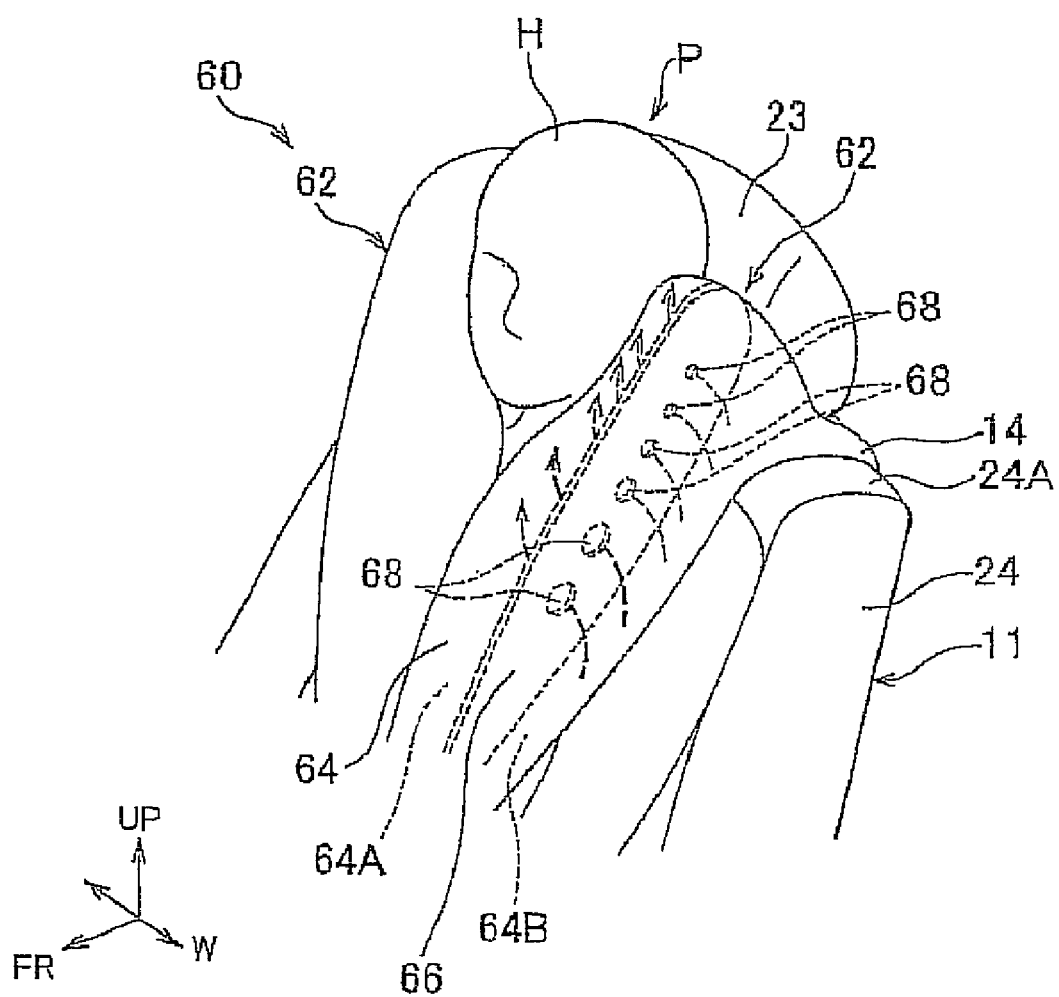
FIG. 7 is a perspective view of a main portion of a vehicle occupant restraint apparatus according to a fourth embodiment of the invention.

FIG. 7 is a perspective view of a main portion of a vehicle occupant restraint apparatus 60 according to a fourth embodiment of the invention. As shown in the drawing, the vehicle occupant restraint apparatus 60 differs from the vehicle occupant restraint apparatus 10 according to the first embodiment in that the shoulder webbings 14 include air belt portions 62 in place of the air belt portions 30.

Each air belt portion 62 is formed by providing a partition cloth 66 that partitions the inside of the bag element 64 in the bag element 64. Specifically, the partition cloth 66 partitions the inside of the deployed bag element 64 into an inner chamber 64A and an outer chamber 64B. The inner chamber 64A serves as an occupant-side chamber located adjacent to the occupant. The outer chamber 64B serves as an anti-occupant-side chamber located outside in the seat width direction with respect to the inner chamber 64A. Although not shown in the drawing, in the vehicle occupant restraint apparatus 60, gas from the inflator 32 is supplied to the outer chambers 64B.

In addition, each partition cloth 66 has a plurality of communication holes 68 that introduce gas, supplied to the outer chamber 64B, into the inner chamber 64A. The plurality of communication holes 68 are arranged substantially along the vehicle vertical direction, and the communication holes 68 located at the lower side have an opening area larger than the communication holes 68 located at the upper side. The other configuration of the vehicle occupant restraint apparatus 60 is similar to the corresponding configuration of the vehicle occupant restraint apparatus 10.

Thus, with the vehicle occupant restraint apparatus 60 according to the fourth embodiment as well, it is possible to obtain similar advantageous effects through the basically similar operation to that of the vehicle occupant restraint apparatus 10 according to the first embodiment.

In addition, in the vehicle occupant restraint apparatus 60, because each bag element 64 is partitioned by the partition cloth 66 having the plurality of communication holes 68 that are smaller as they are located at the upper side, the internal pressure in the upper portion of the inner chamber 64A is lower than the internal pressure in the outer chamber 64B or the internal pressure in the lower portion of the inner chamber 64A at the initial stage and middle stage of deployment process of each air belt portion 62. This reduces a pressure to the head, particularly, the face, of the occupant P by the air belt portions 62. In addition, because a pressure in the inner chamber 64A of each air belt portion 62 gradually increases from the lower side in the deployment process, upthrust to the face of the occupant P from the lower side is reduced.

Figure 8A:
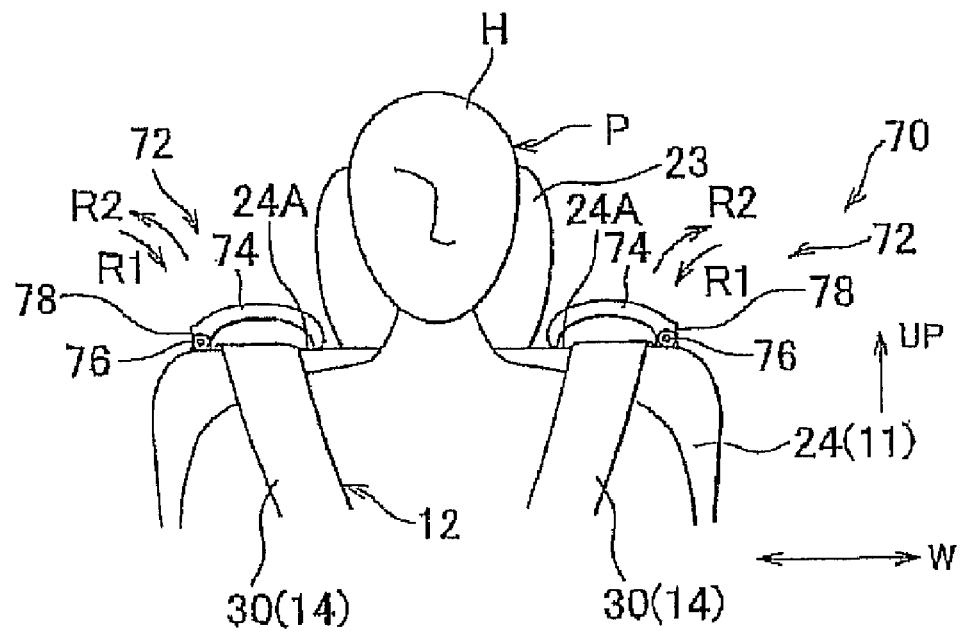
FIG. 8A is a front view of a main portion of a vehicle occupant restraint apparatus that is worn by an occupant and that is in a normal state according to a fifth embodiment of the invention.
Figure 8B:
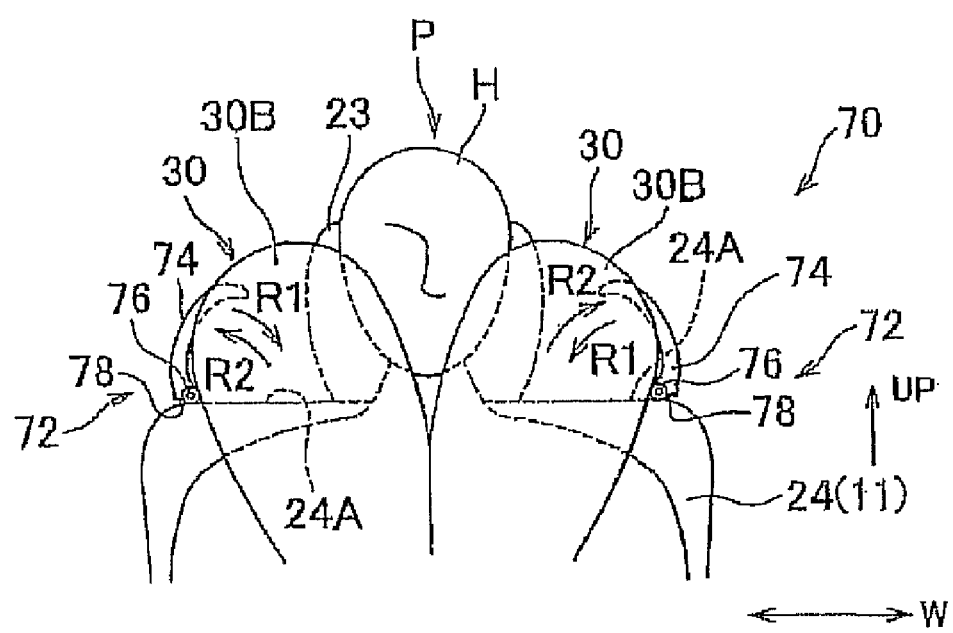
FIG. 8B is a front view of the main portion of the vehicle occupant restraint apparatus when air belt portions are deployed.

FIG. 8A shows a front view of a main portion of a non-activated vehicle occupant restraint apparatus 70 according to a fifth embodiment of the invention. FIG. 8B is a front view of the main portion of the activated vehicle occupant restraint apparatus 70. As shown in these drawings, the vehicle occupant restraint apparatus 70 differs from the vehicle occupant restraint apparatus 10 according to the first embodiment in that belt guides 72 are provided for guiding the air belt portions 30 (shoulder webbings 14).

Each belt guide 72 is provided on the upper end surface (shoulder portion) 24A of the seat back 24, and forms a space, through which the air belt portion 30 can pass, between the belt guide 72 and the upper end surface 24A of the seat back 24. Specifically, each belt guide 72 includes a guide body 74, a pivot support portion 76, and a guide holding device (not shown). The guide body 74 is formed in a circular segment (inverted U shape) and arranged in such a manner that a concave of the guide body 74 faces the upper end surface 24A of the seat back 24. The pivot support portion 76 supports the outer end of the guide body 74 in the seat width direction in such a manner that the guide body 74 is allowed to pivot about the axis that extends in the vehicle longitudinal direction. The guide holding device maintains a state where the inner end of the guide body 74 in the seat width direction is in contact with the upper end surface 24A of the seat back 24. In this state maintained by the guide holding device, each guide body 74 allows the air belt portion 30 to be inserted through a gap formed between the guide body 74 and the upper end surface 24A of the seat back 24, and prevents the air belt portion 30 (shoulder webbing 14) from being deviated from the position at which the occupant P wears the air belt portion 30.

The guide holding device may be, for example, formed of a spring that urges the guide body 74 in a direction indicated by the arrow R1 in FIG. 5A or may be formed of a fastener or clip of which engagement is released (including breakage) when a load larger than or equal to a predetermined value is applied thereto. Thus, in each belt guide 72, when the air belt portion 30 inflates, the guide body 74 is pivoted about the pivot support portion 76 and does not inhibit appropriate inflation of the air belt portion 30.

In addition, a stopper 78 is formed at one end of each guide body 74 adjacent to the pivot support portion 76. When the guide body 74 is pivoted by a predetermined angle in a direction indicated by the arrow R2 about the pivot support portion 76, the stopper 78 contacts the upper end surface 24A of the seat back 24, and then, as shown in FIG. 8B, restricts further pivotal movement of the guide body 74 in the direction indicated by the arrow R2. Then, the guide body 74, which is placed in a deployed position such that pivotal movement in the direction indicated by the arrow R2 is restricted in this way, is raised on the upper end surface 24A of the seat back 24, and supports the inflated air belt portion 30 from the outside in the seat width direction. The deployed position of the guide body 74 is referred to as air belt support position. The other configuration of the vehicle occupant restraint apparatus 70 is similar to the corresponding configuration of the vehicle occupant restraint apparatus 10.

Thus, with the vehicle occupant restraint apparatus 70 according to the fifth embodiment as well, it is possible to obtain similar advantageous effects through the basically similar operation to that of the vehicle occupant restraint apparatus 10 according to the first embodiment.

In addition, because the vehicle occupant restraint apparatus 70 includes the belt guides 72, the occupant P appropriately wears the shoulder webbings 14 provided with the air belt portions 30. Thus, because the air belt portions 30 deploy at appropriate positions in the event of a frontal collision, the air belt portions 30 provide high occupant protection performance. In addition, the guide body 74 of each belt guide 72 is deployed as the air belt portion 30 inflates and is placed in the air belt support position. This effectively suppresses movement of the pair of right and left air belt portions 30 in directions away from each other (moving away from the occupant P). Thus, the vehicle occupant restraint apparatus 70 is able to further effectively restrain forward movement of the occupant P and forward tilting of the head H. It is possible to implement the occupant protection performance equivalent to the vehicle occupant restraint apparatus 10 with the smaller air belt portions 30.

Note that the belt guides 72 are not limited to the example described above. The belt guides 72 having various shapes or structures may also be employed as long as the belt guides 72 have the function of guiding the air belt portions 30 during normal time and the function of supporting the air belt portions 30 from the outside in the seat width direction (preventing the air belt portions 30 from moving away from the occupant P) when the air belt portions 30 inflate.

Figure 9A:
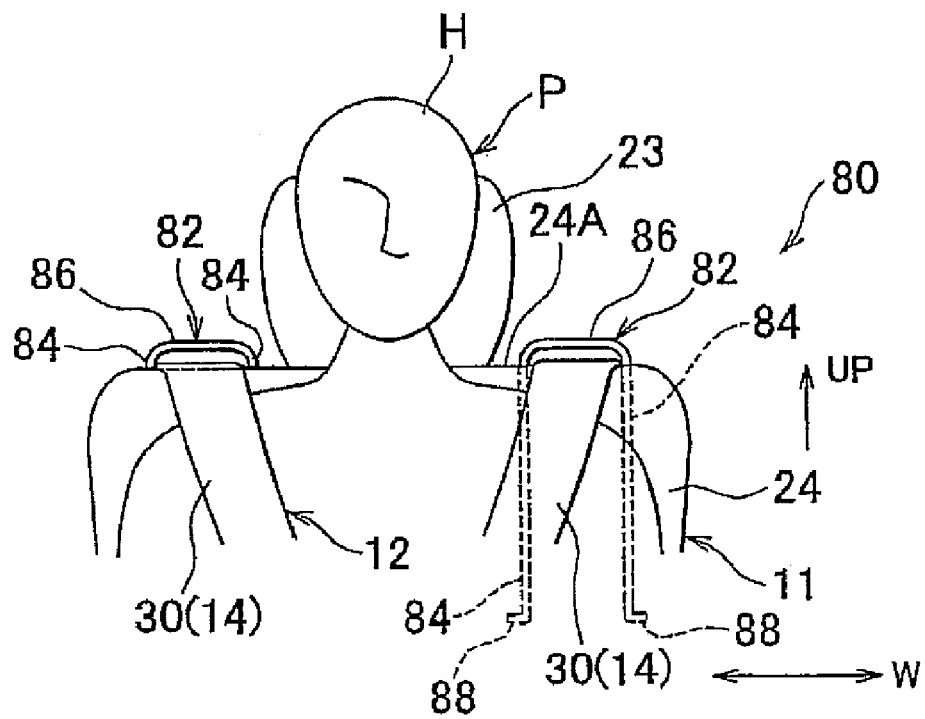
FIG. 9A is a front view of a main portion of a vehicle occupant restraint apparatus that is worn by an occupant and that is in a normal state according to a sixth embodiment of the invention.
Figure 9B:
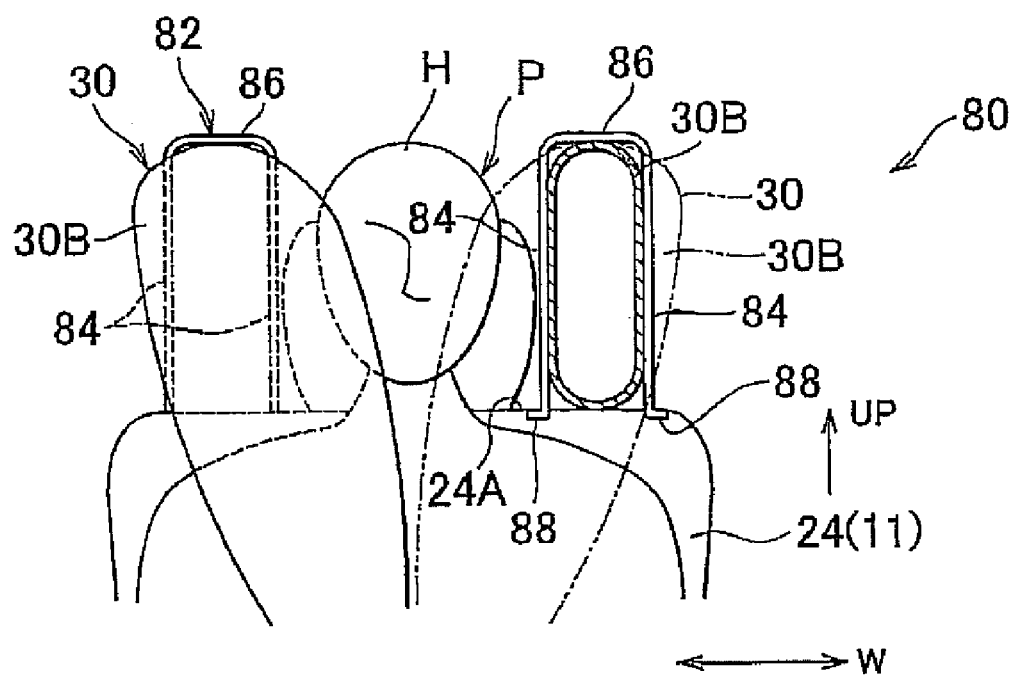
FIG. 9B is a front view of the main portion of the vehicle occupant restraint apparatus when air belt portions are deployed, with part cut away.

FIG. 9A shows a front view of a main portion of a non-activated vehicle occupant restraint apparatus 80 according to a sixth embodiment of the invention. FIG. 9B is a front view of the main portion of the activated vehicle occupant restraint apparatus 80 with part cut away. As shown in these drawings, the vehicle occupant restraint apparatus 80 differs from the vehicle occupant restraint apparatus 10 according to the first embodiment in that belt guides 82 are provided for guiding the air belt portions 30 (shoulder webbings 14).

Each belt guide 82 is formed in a substantially inverted U shape such that an upper wall portion 86 extending in the seat width direction connects the upper ends of a pair of right and left legs 84 to open downward in the vehicle vertical direction. Portions of the belt guide 82, other than portions of the pair of right and left legs 84 adjacent to the upper wall portion 86, are inserted in the seat back 24 so that each belt guide 82 forms a space, through which the air belt portion 30 passes, between the upper end surface 24A of the seat back 24 and the upper wall portion 86.

Each belt guide 82 maintains the above space because, for example, a stopper (not shown) prohibits further insertion of each leg 84 into the seat back 24. In this state, each belt guide 82 allows the air belt portion 30 to be inserted through a gap formed between the upper wall portion 86 and the upper end surface 24A of the seat back 24, and prevents the air belt portion 30 (shoulder webbing 14) from being deviated from the position at which the occupant P wears the air belt portion 30.

In addition, the pair of right and left legs 84 of each belt guide 82, inserted in the seat back 24, are supported so as to be slidable in the vehicle vertical direction by guide devices (not shown), respectively. Thus, each belt guide 82 slides upward as shown in FIG. 9B as the air belt portion 30 inflates. An upper slide limit of each belt guide 82 is restricted by engaging a stopper 88 provided at the lower end of each leg 84 with the seat back 24. The slide limit is set in such a manner that the upper wall portion 86 reaches the level that is equal to or higher than that of the upper end of the head H.

Each belt guide 82 located at the slide limit is configured in such a manner that the leg 84 located at the outer side in the seat width direction supports the inflated air belt portion 30 from the outer side in the seat width direction. In addition, in this state, the right and left legs 84 of the belt guide 82 restrict deployment of the air belt portion 30 in the seat width direction. Thus, the air belt portions 30 are deployed to the level equal to or higher than the level of the top of the head H, as shown in FIG. 9B, at least at the positions at which the belt guides 82 are installed.

In addition, an ECU (not shown) that constitutes the vehicle occupant restraint apparatus 80 is electrically connected to a side collision sensor (not shown), and activates the inflator 32 when the ECU detects a side collision on the basis of a signal from the side collision sensor or when the ECU determines that a side collision is unavoidable. The other configuration, including the control of the ECU in the event of a frontal collision, of the vehicle occupant restraint apparatus 80 is similar to the corresponding configuration of the vehicle occupant restraint apparatus 10.

Thus, with the vehicle occupant restraint apparatus 80 according to the sixth embodiment as well, it is possible to obtain similar advantageous effects through the basically similar operation to that of the vehicle occupant restraint apparatus 10 according to the first embodiment.

In addition, because the vehicle occupant restraint apparatus 80 includes the belt guides 82, the occupant P appropriately wears the shoulder webbings 14 provided with the air belt portions 30. Thus, because the air belt portions 30 are deployed at appropriate positions in the event of a frontal collision, the air belt portions 30 provide high occupant protection performance. In addition, the leg 84 located outside in the vehicle width direction in each belt guide 82 slides upward as the air belt portion 30 inflates to support the air belt portion 30 from the outside in the vehicle width direction. This effectively suppresses movement of the pair of right and left air belt portions 30 in directions moving away from each other (moving away from the occupant P). Thus, the vehicle occupant restraint apparatus 80 is able to further effectively restrain forward movement of the occupant P and forward tilting of the head H. It is possible to implement the occupant protection performance equivalent to the vehicle occupant restraint apparatus 10 with the smaller air belt portions 30.

Furthermore, when a side collision to a vehicle equipped with the vehicle occupant restraint apparatus 80 is detected or predicted, the inflator 32 is activated to deploy the air belt portions 30. Thus, the head H of the occupant P is protected from the sides. Here, in the vehicle occupant restraint apparatus 80, the right and left legs 84 of each belt guide 82 restrict deployment of the air belt portion 30 in the seat width direction, so each air belt portion 30 deploys so as to form an oblong (long in the vehicle vertical direction) shape in cross section as shown in FIG. 9B. Thus, each air belt portion 30 is formed in an oblong shape in cross section immediately in front of the belt guide 82, so the shape of each deployed air belt portion 30 may be formed so as to substantially cover the head H of the occupant P in side view. Thus, the vehicle occupant restraint apparatus 80 is able to effectively protect the head H of the occupant P against a side collision without the help of, for example, a curtain airbag, or the like.

Note that in the sixth embodiment, the example in which the air belt portions 30 are deployed in the event of a side collision is described; however, the aspects of the invention are not limited to it. Instead, for example, a rollover sensor that detects a rollover may be provided and then the air belt portions 30 may deploy in the event of a rollover as well.

In addition, in the sixth embodiment, the example in which the belt guides 82 slide as the air belt portions 30 inflate is described; however, the aspects of the invention are not limited to it. Instead, for example, a locking device that locks the belt guides 82 to the seat back 24 may be provided, and then the belt guides 82 may remain locked in the event of a frontal collision, while the locking of the belt guides may be released in the event of a side collision (rollover) to deploy the air belt portions 30 in an oblong shape.

Furthermore, the belt guides 82 are not limited to the above described example. The belt guides 82 having various shapes or structures may also be employed as long as the belt guides 82 have the function of guiding the air belt portions 30 during normal time, the function of supporting the air belt portions 30 from the outside in the seat width direction (preventing the air belt portions 30 from moving away from the occupant P) when the air belt portions 30 inflate, and the function of restricting deployment of the air belt portions 30 in the seat width direction (function of deploying the air belt portions 30 in an oblong shape).

The above embodiments describe an example in which the air belt portions 30, 52 or 62 follow the retraction and withdrawal operations of the shoulder webbings 14; however, the aspects of the invention are not limited to it. Instead, for example, the upper ends of the air belt portions 30, and the like, may engage the upper end surface 24A of the seat back 24 while the shoulder webbings 14 may be slidably inserted through the air belt portions 30 and the like. This configuration has a high degree of flexibility in installation of the air belt portions 30, and the like.

In addition, the above embodiments describe an example in which the four-point seat belt 12 includes the pair of shoulder webbings 14 and the pair of lap webbings 16; however, the aspects of the invention are not limited to it. The aspects of the invention may be implemented using various four-point seat belts.

Furthermore, the above embodiments describe an example in which the air belt portions 30, 52 or 62 are deployed so as to restrain forward movement of the head H of the occupant P. When the air belt portions 30, and the like, are configured so that the middle portions 30C in the vehicle vertical direction deploy so as to be thicker in the vehicle longitudinal direction than the other portions as shown in FIG. 2, it is possible to quickly restrain the chest of the occupant. That is, with a vehicle occupant restraint apparatus that includes a four-point seat belt that has a pair of right and left upper body restraint webbings; a pair of inflatable portions that are respectively provided for the pair of right and left upper body restraint webbings and that respectively inflate with supplied gas and deploy in such a manner that portions corresponding to a chest of an occupant are thicker in a vehicle longitudinal direction than the other portions; and a gas supply device that supplies gas from lower sides of the inflatable portions in a vehicle vertical direction, the pair of right and left upper body restraint webbings of the four-point seat belt are worn so as to be able to restrain the upper body of the occupant. For example, as the gas supply device is activated when a vehicle collision (frontal collision) is detected or predicted, the right and left inflatable portions inflate with gas supplied from the gas supply device and then deploy into a predetermined shape. Here, in the vehicle occupant restraint apparatus, gas is supplied from the lower sides, that is, from the waist side of the occupant, to the inflatable portions provided for the upper body restraint webbings. Thus, the inflatable portions adjacent to the waist inflate and deploy in a short time. Thus, for example, it is possible to prevent a contact of the waist (abdomen), which is located closer to a vehicle body (steering wheel, instrument panel or the like) than the other portions in the upper body of the occupant, with the vehicle body. Then, in the vehicle occupant restraint apparatus, portions corresponding to the chest of the occupant in the inflatable portions inflate with gas supplied from the lower sides and deploy in a short time so as to be thicker in the vehicle longitudinal direction than the other portions. Thus, the chest, which has large mass (inertia) in the upper body, is quickly restrained. In addition, portions corresponding to the chest in the inflatable portions deploy largely in the vehicle longitudinal direction as compared with the portions corresponding to the other part of the occupant. Thus, it is possible to effectively prevent a contact of the occupant (chest or abdomen) with the vehicle body (steering wheel, instrument panel, or the like).

In addition, the aspects of the invention are not limited to the configurations of the above described embodiments; of course, they may be modified into various forms. In addition, of course, the elements of the above described embodiments may be implemented appropriately in combination.

What is claimed is:

1. A vehicle occupant restraint apparatus comprising:
a four-point seat belt that has a pair of right and left upper body restraint webbings; and
a pair of inflatable portions that are respectively provided for the pair of right and left upper body restraint webbings, wherein the pair of inflatable portions inflate with gas supplied from a gas supply device and then deploy so as to restrain a head of an occupant from moving forward in a vehicle longitudinal direction,
wherein portions of bag elements that inflate with the gas supplied from the gas supply device, the portions being the occupant's head-sides in a vehicle width direction in a deployed state are folded inward along longitudinal directions of the respective webbings, the folded portions being sewed with tear seams that break at an internal pressure in the bag elements, which is higher than or equal to a predetermined value, to form the pair of inflatable portions.

2. The vehicle occupant restraint apparatus according to claim 1, wherein the gas supply device is arranged below the inflatable portions in a vehicle vertical direction, and supplies gas from lower sides of the inflatable portions in the vehicle vertical direction.

3. The vehicle occupant restraint apparatus according to claim 2, wherein portions corresponding to a chest of the occupant in the pair of inflatable portions when deployed are thicker in the vehicle longitudinal direction than the other portions of the pair of inflatable portions.

4. The vehicle occupant restraint apparatus according to claim 2, wherein middle portions of the pair of inflatable portions are thicker in the vehicle longitudinal direction than the other portions of the pair of inflatable portions in the vehicle longitudinal direction.

5. The vehicle occupant restraint apparatus according to claim 2, further comprising:
an airbag that is applied to a driver's seat and that is provided inside a steering wheel so as not to follow rotation of the steering wheel, wherein
the airbag inflates with gas supplied from the gas supply device and then deploys so as to cover only an upper portion of the steering wheel in the vehicle vertical direction or deploy in such a manner that an upper portion of the airbag in the vehicle vertical direction is thicker than a lower portion of the airbag.

6. The vehicle occupant restraint apparatus according to claim 1, further comprising:
guide portions that are provided on an upper portion of a seat back and that restrict movement of the inflatable portions in a seat width direction, wherein
the guide portions each have a support portion that supports a corresponding one of the inflatable portions from a side opposite to an occupant side in a state where the guide portion is deployed as the inflatable portion inflates.

7. The vehicle occupant restraint apparatus according to claim 6, wherein
the guide portions are deployed as the inflatable portions inflate and restrict deployment of the inflatable portions in such a manner that a cross-sectional shape of each inflatable portion when deployed is oblong in the vehicle vertical direction.

8. The vehicle occupant restraint apparatus according to claim 1, further comprising:
guide portions that are provided on an upper portion of a seat back and that restrict movement of the inflatable portions in a seat width direction, wherein
each guide portion includes a guide body that is formed in an inverted U shape and that is arranged in such a manner that a concave of the guide body faces an upper end surface of the seat back, and a pivot support portion that supports an outer end of the guide body in the seat width direction in such a manner that the guide body is allowed to pivot about an axis that extends in the vehicle longitudinal direction.

9. The vehicle occupant restraint apparatus according to claim 8, wherein a stopper is formed at one end of the guide body adjacent to the pivot support portion.

10. A vehicle occupant restraint apparatus comprising:
a four-point seat belt that has a pair of right and left upper body restraint webbings; and
a pair of inflatable portions that are respectively provided for the pair of right and left upper body restraint webbings, wherein the pair of inflatable portions inflate with gas supplied from a gas supply device and then deploy so as to position a portion of a head of an occupant above a jaw between the pair of inflatable portions and restrain the head of the occupant from moving in a vehicle width direction,
wherein the pair of inflatable portions each include a partition member inside a bag element that inflates with the gas supplied from the gas supply device, and the partition member partitions an inside of the bag element into an occupant-side chamber and an anti-occupant-side chamber in such a manner that the occupant-side chamber and the anti-occupant-side chamber are next to each other in a vehicle width direction, the occupant-side chamber deploying in such a manner that a portion of an inner portion of the bag element faces toward and extends above the jaw of the occupant, and the anti-occupant-side chamber deploying so as to face a side opposite the head of the occupant.

11. The vehicle occupant restraint apparatus according to claim 10, wherein the pair of inflatable portions inflate with gas supplied from the gas supply device and then deploy so as to place a face of the occupant in between from both sides.

12. The vehicle occupant restraint apparatus according to claim 10, wherein
the gas supply device supplies gas to the anti-occupant-side chamber in each bag element, and
each partition member has a communication hole that provides communication between the occupant-side chamber and the anti-occupant-side chamber that deploys so as to face the side opposite to the head of the occupant.

13. The vehicle occupant restraint apparatus according to claim 10, wherein
the gas supply device supplies gas to the anti-occupant-side chamber in each bag element, and
each partition member has a plurality of communication holes that are spaced apart from one another and arranged in the vehicle vertical direction when the bag element is deployed.

14. The vehicle occupant restraint apparatus according to claim 13, wherein
the plurality of communication holes are formed so that the communication holes located at a lower side in the vehicle vertical direction are larger than the communication holes located at an upper side in the vehicle vertical direction.

15. The vehicle occupant restraint apparatus according to claim 10, wherein
the gas supply device supplies gas to the anti-occupant-side chamber in each bag element, and
each partition member is formed in such a manner that an internal pressure in an upper portion of the occupant-side chamber is lower than an internal pressure in a lower portion of the occupant-side chamber or an internal pressure in the anti-occupant-side chamber that deploys so as to face the side opposite to the head of the occupant at initial and middle stages of a deployment process of each inflatable portion.

16. The vehicle occupant restraint apparatus according to claim 10, wherein the gas supply device is arranged below the inflatable portions in a vehicle vertical direction, and supplies gas from lower sides of the inflatable portions in the vehicle vertical direction.

17. The vehicle occupant restraint apparatus according to claim 10, wherein
portions of bag elements that inflate with gas supplied from the gas supply device are folded inward along longitudinal directions of the respective webbings so as to deploy to face the head of the occupant, and the folded portions are sewed with tear seams that break at an internal pressure in the bag elements, which is higher than or equal to a predetermined value, to form the pair of inflatable portions.

18. The vehicle occupant restraint apparatus according to claim 10, further comprising:
guide portions that are provided on an upper portion of a seat back and that restrict movement of the inflatable portions in a seat width direction, wherein
the guide portions each have a support portion that supports a corresponding one of the inflatable portions from a side opposite to an occupant side in a state where the guide portion is deployed as the inflatable portion inflates.

19. The vehicle occupant restraint apparatus according to claim 10, further comprising:

guide portions that are provided on an upper portion of a seat back and that restrict movement of the inflatable portions in a seat width direction, wherein each guide portion includes a guide body that is formed in an inverted U shape and that is arranged in such a manner that a concave of the guide body faces an upper end surface of the seat back, and a pivot support portion that supports an outer end of the guide body in the seat width direction in such a manner that the guide body is allowed to pivot about an axis that extends in a vehicle longitudinal direction.

20. A vehicle occupant restraint apparatus comprising:

a four-point seat belt that has a pair of right and left upper body restraint webbings; and a pair of inflatable portions that are respectively provided for the pair of right and left upper body restraint webbings, wherein the pair of inflatable portions inflate with gas supplied from a gas supply device and then deploy so as to restrain a head of an occupant from moving forward in a vehicle longitudinal direction, wherein the pair of inflatable portions are formed by sewing portions of bag elements with tear seams that break at an internal pressure in the bag elements, which is higher than or equal to a predetermined value.

* * * * *

UNITED STATES PATENT AND TRADEMARK OFFICE
CERTIFICATE OF CORRECTION

| | |
|---|---|
| PATENT NO. | : 8,038,170 B2 |
| APPLICATION NO. | : 12/351034 |
| DATED | : October 18, 2011 |
| INVENTOR(S) | : Mutsumu Haraoka et al. |

It is certified that error appears in the above-identified patent and that said Letters Patent is hereby corrected as shown below:

Column 1, line 32 - delete "all" and insert --an--
Column 1, line 37 - delete "tirne" and insert --time--
Column 2, line 4 - delete "bead" and insert --head--
Column 2, line 42 - delete ")" and insert --,--
Column 2, line 43 - delete "fight" and insert --right--
Column 2, line 47 - delete "bead" and insert --head--
Column 5, line 24 - delete "bead" and insert --head--
Column 6, line 67 - delete "wom" and insert --worn--
Column 8, lines 26-27 - delete "refractors" and insert --retractors--
Column 9, line 9 - delete "diver's" and insert --driver's--
Column 12, line 59 - delete "5A" and insert --8A--
Column 13, line 64 - delete "wail" and insert --wall--

Signed and Sealed this
Twentieth Day of March, 2012

David J. Kappos
*Director of the United States Patent and Trademark Office*